United States Patent [19]

Wible et al.

[11] Patent Number: 4,944,357
[45] Date of Patent: Jul. 31, 1990

[54] POWER TRANSFERRING ARRANGEMENT

[75] Inventors: John E. Wible, Painesville, Ohio; Paul D. Grohsmeyer, Dunlap, Ill.

[73] Assignee: Caterpillar Industrial Inc., Mentor, Ohio

[21] Appl. No.: 343,704

[22] Filed: Apr. 27, 1989

[51] Int. Cl.[5] .............................................. B60T 7/16
[52] U.S. Cl. .................................. 180/169; 414/222; 414/278; 439/131; 439/259; 439/374
[58] Field of Search ................ 180/167, 169; 439/374, 439/131, 259; 333/255, 256, 257; 414/901, 257, 278, 222, 273

[56] References Cited

U.S. PATENT DOCUMENTS

| | | | |
|---|---|---|---|
| 1,390,607 | 9/1921 | Farmer | 439/259 |
| 3,322,913 | 5/1967 | Bradstock et al. | 200/61.42 |
| 4,700,121 | 10/1987 | Neri | 414/278 |

FOREIGN PATENT DOCUMENTS

| | | |
|---|---|---|
| 0100867 | 2/1984 | European Pat. Off. . |
| 2146406 | 3/1973 | France . |
| 1492787 | 11/1977 | United Kingdom . |

OTHER PUBLICATIONS

IBM Technical Disclosure Bulletin, vol. 26, No. 3A, dated Aug., 1983, to L. A. Johnson et al.

German Publication f & h–Fordern and Heben, vol. 35, No. 12, dated Dec., 1985, to H.-G. Brinkmann.

Primary Examiner—Charles A. Marmor
Assistant Examiner—Eric Culbreth
Attorney, Agent, or Firm—Alan J. Hickman

[57] ABSTRACT

A contactor assembly having contacting head portion is mounted on a vehicle and a receiving device is mounted on a load transfer station. The contactor assembly and receiving device is provided for transferring electrical energy from a source of electrical energy between the load transfer station and the vehicle and improves the flexibility of load transfer station location and relocation. The contacting head portion is transversely movable between first and second spaced apart locations relative to the vehicle and into engagement with the receiving device. A sensing device is provided for sensing the position of the vehicle relative to the load transfer station and delivering an actuator control signal to an actuating device in response to the contacting head portion and the receiving device being aligned for mating engagement. The actuating device moves the contacting head portion from the first position to the second position in response to the receiving the actuating control signal. The contactor assembly is particularly suited for use on an automatic guided vehicle.

25 Claims, 3 Drawing Sheets

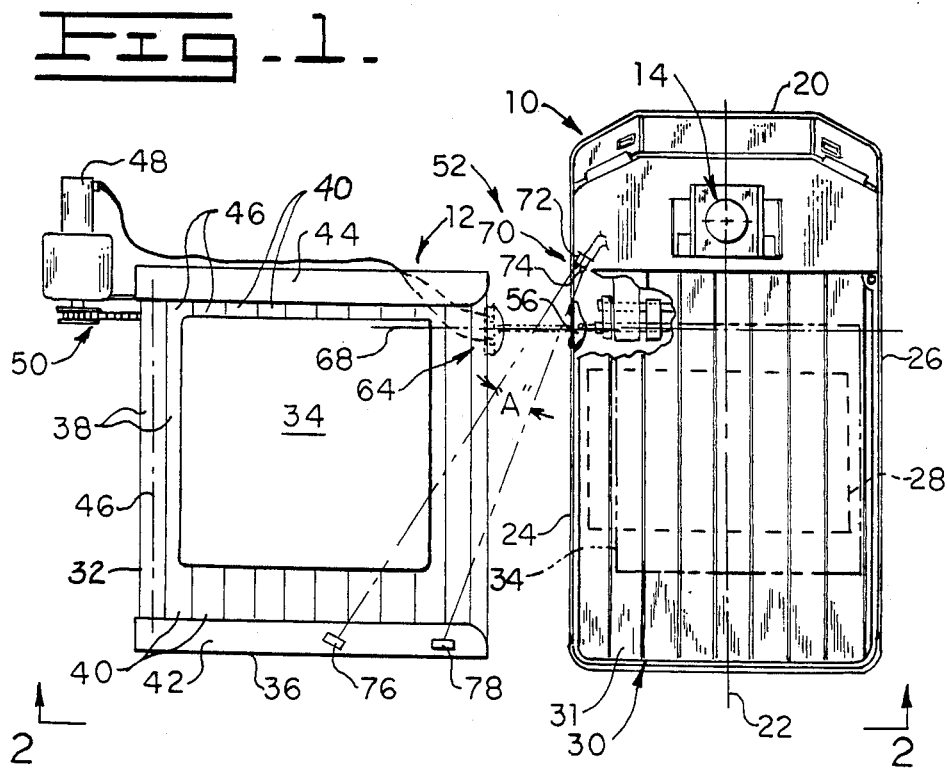
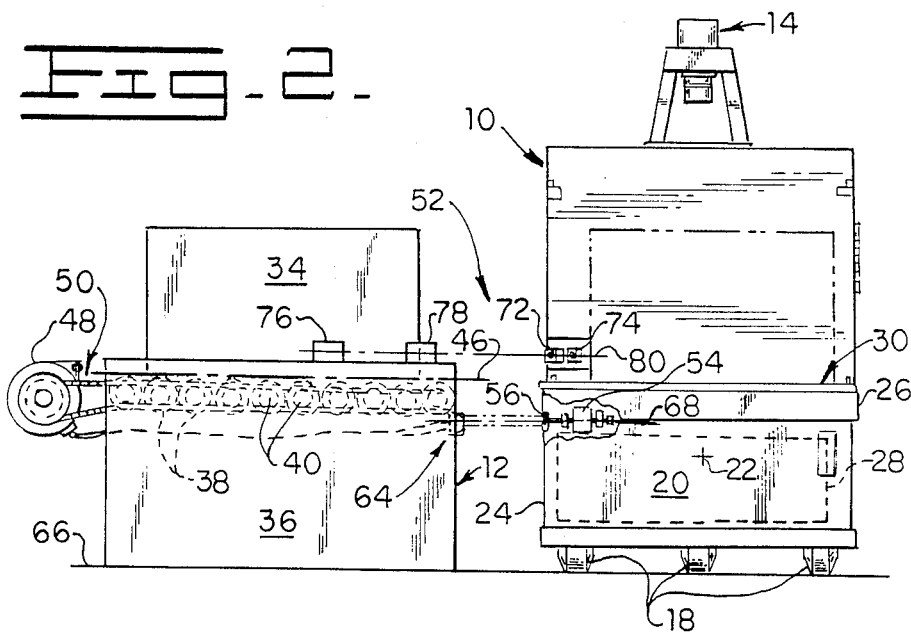

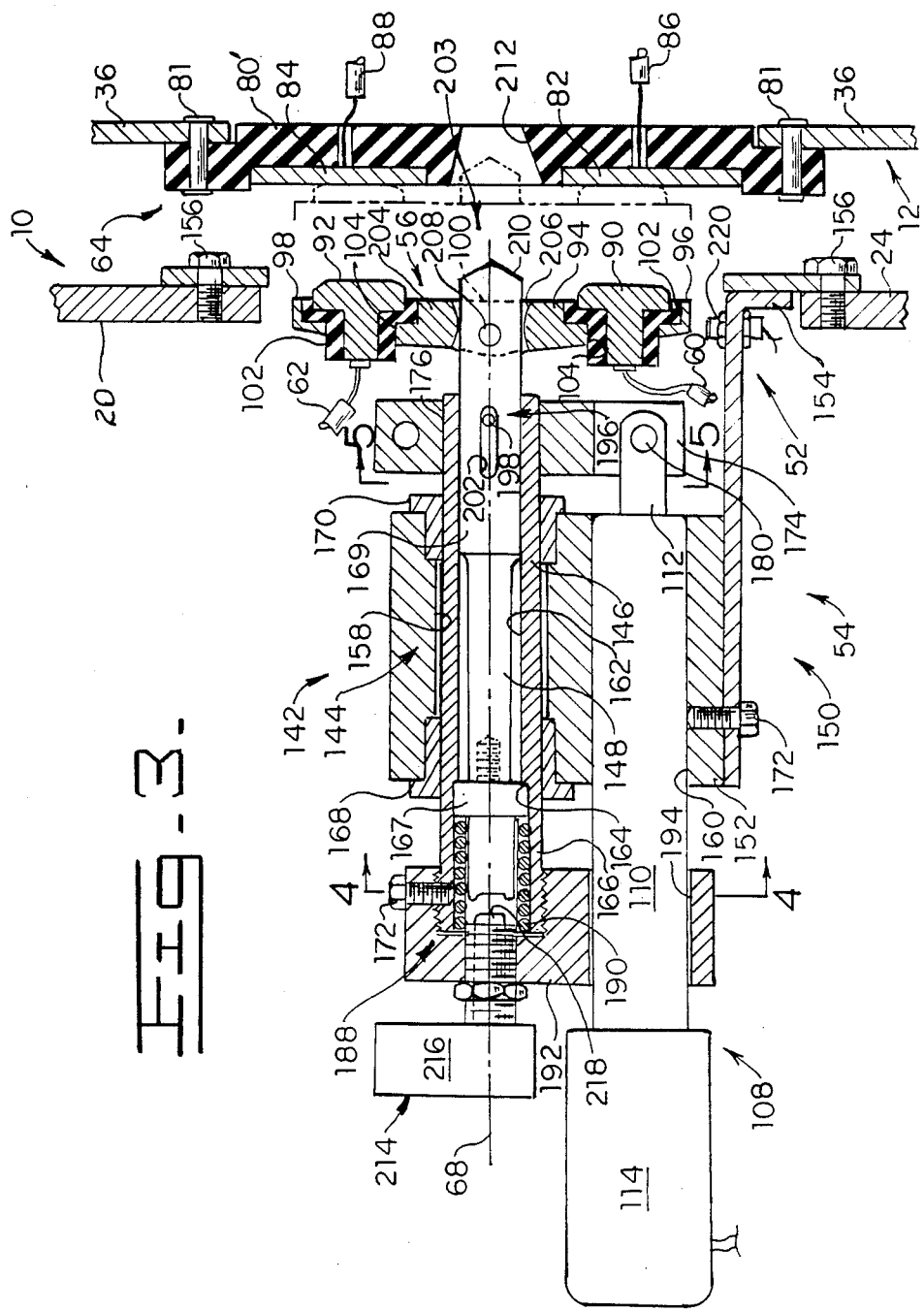

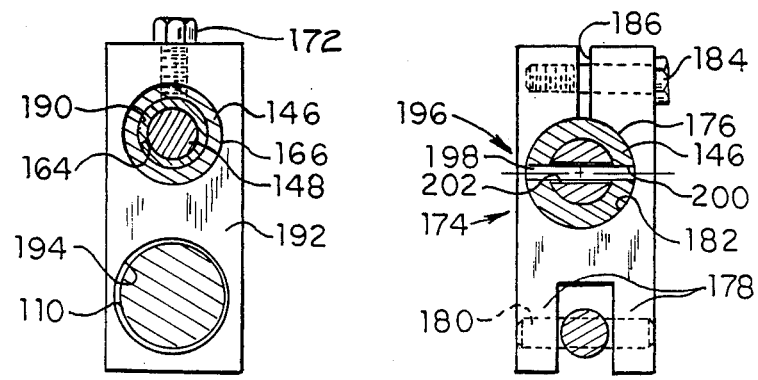
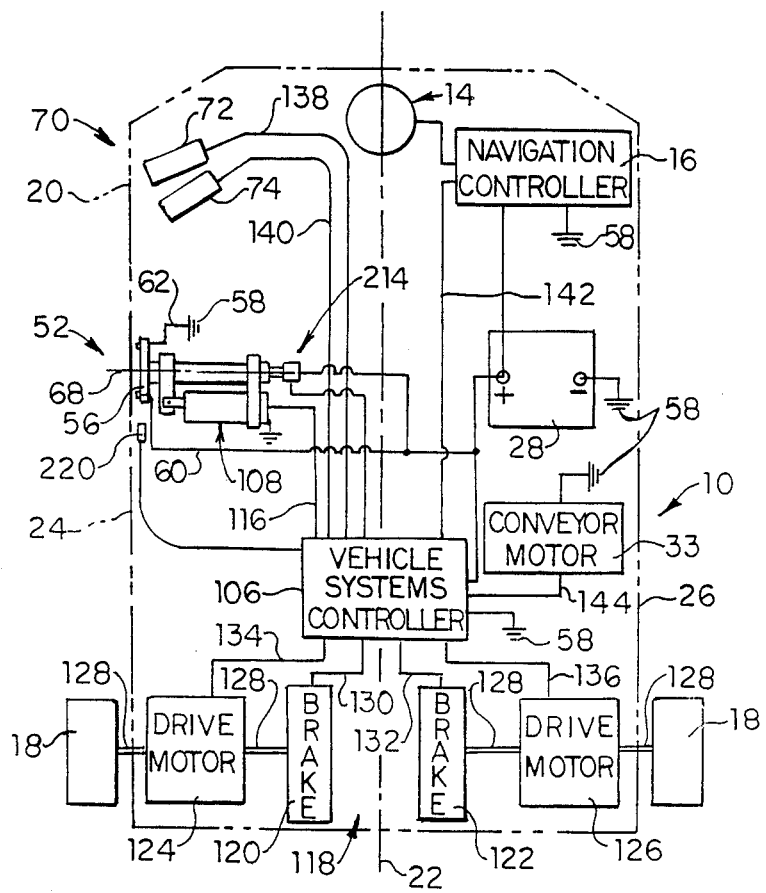

POWER TRANSFERRING ARRANGEMENT

TECHNICAL FIELD

This invention relates to an arrangement for transferring electrical energy between a work vehicle and a load transfer station and more particularly to a power transferring arrangement having a contact portion which is movable relative to the work vehicle and engageable with a receptacle mounted on the load transfer station in response to the work vehicle being at a preselected position relative to the load transfer station.

BACKGROUND ART

Work vehicles such as lift trucks, automated guided vehicles, mobile transporters and the like are often utilized for transferring a load such as, a pallet, a work piece, a tub and the like between load transfer stations such as, storage areas, machining cells, conveyors and assembly lines. These load transfer stations have often have propelled devices such as, motor driven conveyors, drills, mills, grinders etc. which require a source of electric energy. Thus, the facility is fixedly wired in an appropriate manner to transfer electrical current from the house main to the electric drive motors. This permanent wiring is satisfactory in applications where the work being performed remains constant over a relatively long period of time. However, in applications where the load transfer stations are frequently moved due to changes in storage, machining and assembly requirements, the fixed wiring is a problem. Often the ability to move the wiring is extremely difficult due to the construction of the facility and very costly in both time and money.

In applications where there are numerous load transfer stations the cost and complexity associated with providing electrical wiring for each station is substantial. As a result of this excessive cost the number of load transfer stations is reduced from the optimum. As a result the efficiency of the operation is less than achievable which ultimately increases the cost of the product or service to the customer.

Each of the load transfer stations, in addition to requiring electrical energy for powering the motors, require communication sensors for the purpose of turning on and off the motors when a load is ready to be transferred from the work vehicle. It is emphasized that each load transfer station requires communication sensors. As a result the cost and complexity of each load transfer station is increased.

It has been known to drive a load transfer station conveyor by a vehicle mounted mechanical drive system of the friction or coupling type. One such a system is shown in European Patent No. 0100867, to Max Braendli et al, which published on Feb. 22, 1984. This patent discloses an automatic guided vehicle having a roller deck and a conveyor stand having a roller deck. A coupling half on the vehicle is matable with a coupling half on the conveyor at an aligned position of the coupling half. The coupling half on the vehicle is connected to a roller deck drive motor and transfers powered rotary motion from the conveyor drive motor through the coupling half to the coupling half on the conveyor stand. The conveyor stand coupling half is drivingly connected to the conveyor stand rollers and rotates the rollers in response to rotation thereof. A mechanical drive system such as this is not satisfactory in that the amount of power being transferred and the speed of operation is limited to the functional characteristics of the vehicle conveyor drive motor. Thus, the maximum size of the conveyor stand is limited in load capacity, conveyor length and the like. As a result, the number of applications are limited to just a few.

In addition to the size limitation of the stand mounted conveyor, the two coupling halves must be accurately aligned relative to each other in order to permit successful mating and power transfer. Thus, the surface upon which the vehicle operates must be of the highest quality in order to maintain accuracy in the distance from the surface to each of the coupling halves. In applications where a large number of conveyor stands are used the cost of providing such close tolerances is extremely difficult. The dynamics of the vehicle further adds to the alignment problems. Since the load being carried on the vehicle will vary in magnitude the elevational distance between the surface and the coupling will also vary. This is based factors such as vehicle frame deflection, tire crush and suspension sag.

In the event that the automatic guided vehicle docks at a skewed or angled position relative to the conveyor the ability to successfully achieve coupling will be unlikely. This will result in undesirable down time and delays until the problem is corrected such as, by manual intervention by a vehicle system operator.

In automatic guided vehicles in which mechanical power transfer, such as disclosed in the Max Braendli et al. publication, is provided, extreme accuracy of docking is mandatory. In order to achieve this accuracy a sophisticated vehicle control system is required. Such a system utilizes expensive and elaborate sensors to identify when the vehicle is in position to dock. Such systems often fail to be accurate enough to precisely locate the vehicle relative to the conveyor stand. Thus, premature wear of the mechanical drive coupling or failure to mate often occurs.

Mechanical drives such as shown in the Max Braendli et al. publication do not transfer of electrical energy for the powering of secondary functions on the load transfer station. Therefore, control of the conveyor, the load being transferred, the stop gates on the load transfer station and the like is not available. As a result the controllability and flexibility of operation of the load transfer station is limited and only mechanical conveyor drive is provided.

The present invention is directed to overcoming one or more of the problems as set forth above.

DISCLOSURE OF THE INVENTION

In one aspect of the present invention, a power transferring arrangement for passing electrical energy from a source of electrical energy and between an automatic guided vehicle having a frame, and a longitudinal vehicle axis, and a load transfer station having an electrically powered motor is provided. A contactor assembly has a contacting head portion which is connected to the source of electrical energy and movably connected to the frame. The contacting head portion is movable between a first position closely adjacent the frame and a second position outwardly of the frame and spaced from the first position. A device is provided for receiving the contacting head portion and passing electrical energy from the contacting head portion to said electric motor. A sensor senses the position of the vehicle relative to the load transfer station and delivers a position control signal in response to the automatic guided vehicle being adjacent the load transfer station. A control device is provided for receiving the position control signal and for delivering an actuator control signal in response to receiving the position control signal. An actuator receives the actuator control signal and moves the contacting head portion from the first position toward the second position and into engagement with the receiving device.

In another aspect of the present invention a power transferring arrangement is provided for passing electrical energy from a work vehicle having a frame, a longitudinal vehicle axis, and a source of electrical energy to a load transfer station having an electrically powered motor. A contactor assembly has a contacting head portion connected to the source of electrical energy and movably connected to the frame. The contacting head portion is movable between a first position closely adjacent the frame and a second position spaced outwardly of the frame and spaced from the first position. The contactor assembly has a guide housing, a guide member connected to the contacting head portion and slidably connected to the guide housing, and movable relative to the guide housing between an extended position and a retracted position. A biasing means urges the guide member toward the extended position and permits movement of the guide member toward the retracted position in response to the external force being applied to the contacting head portion. A receiving device on the load transfer station is provided for receiving the contacting head portion and passing electrical energy from the contacting head portion to the electric motor. An actuator connected to the guide housing receives the actuator control signal and moves the contacting head portion from the first position toward said second position and into engagement with the receiving device.

The power transferring arrangement provides the transfer of electrical energy from a work vehicle to a load transfer station. Thus, the limitations of load transfer station size and capacity are overcome. Since electrical energy and not mechanical rotary power is being transferred, other devices such as machine tools, assembly line tools, and the like may be powered by the vehicle.

The power transferring arrangement utilizes sensors to control docking of the vehicle but, because of the construction of the contacting head portion and the receiving device the need for accuracy of position is substantially relaxed over typical mechanical drive systems. In addition the movability of the contacting head portion from the first position to the second position subsequent to docking reduces the potential of damage to the contacting head portion and associated elements since at all other times the head portion is at the first position adjacent the vehicle frame.

Since the contacting head portion is movable in response to an external force being applied thereto, an range of docking error is accommodated. Therefore the distance between the vehicle and the load transfer station may deviate within tolerances from the nominal without affecting the ability of the contacting head portion to successfully engage receiving device.

Projection of a guide member past the contacting head portion provides a keying function with the tapered bore of a receiving device and prevents the contacting head portion from making inadvertent electrical contact with another surface.

The ability of the contacting head portion to pivot solves the problem of the vehicle docking at a slight angle or skew relative to the load transfer station without affecting the ability to mate for electrical energy transfer.

BRIEF DESCRIPTION OF THE DRAWINGS

FIG. 1 is a diagrammatic top plan view of an embodiment of the present invention showing an automatic guided vehicle docked adjacent a load transfer station with the contacting head portion of a power transferring arrangement shown in phantom lines engaging a receiving means;

FIG. 2 is a diagrammatic rear elevational view taken along lines II—II of FIG. 1;

FIG. 3 is a diagrammatic crossectional view of the power transferring arrangement of FIG. 1;

FIG. 4 is a diagrammatic crossectional view taken along lines IV—IV of FIG. 3;

FIG. 5 is a diagrammatic crossectional view taken along lines V—V of FIG. 3; and FIG. 6 is a diagrammatic schematic representation of the vehicle control system.

BEST MODE FOR CARRYING OUT THE INVENTION

With reference to the drawings, and particularly FIGS. 1 and 2, a work vehicle 10 of the type used to transfer loads and the like between various load transfer stations 12 is provided. The particular work vehicle 10 shown is as an automatic guided carrier vehicle; however, other material handling vehicles utilized in manufacturing, storage and warehousing applications are considered within the scope of this invention. The automatic guided vehicle (AGV) disclosed herein is driverless and able to travel from location to location without human intervention. It is free ranging and able to navigate between locations without the need for wires, reflective tape, or markings on the floor. The AGV utilizes a laser scanner 14 mounted on the vehicle and a plurality of spaced apart bar coded targets (not shown) mounted within the facility for navigation purposes. The laser scanner reads the location of the targets and a navigation controller 16 (FIG. 6) on the vehicle 10 calculates using triangulation the location of the vehicle and guides the vehicle along a preprogrammed path stored in memory. The vehicle also has the ability to dead-reckon, for example, to travel along a preprogrammed path stored in the memory of the vehicle controller without the aid of external information. To achieve dead-reckoning the vehicle travel is continuously monitored by on-board sensors (not shown), such as, rotation, position and steering angle resolvers (all not shown) associated with at least one of the vehicle wheels 18. This information is delivered to the controller 16 and the controller, based on this feedback, controls the operation of the vehicle 12. Thus, in the event the targets become blocked the ability to dead-reckon allows the vehicle to continue to travel when the laser/targets are blocked for a preselected distance of vehicle travel.

The vehicle 10 has a frame 20 and a longitudinal vehicle axis 22 which extends substantially parallel to and between first and second frame sides 24, 26. The scanner is mounted on an upper end portion of the frame 20 and the wheels 18 are rotatively connected to the frame 20 in a conventional manner. A source of electrical energy 28, such as a storage battery, and the like is supported on the frame 20 at a location beneath a load supporting device 30 mounted on the frame 20 and between the first and second sides 24,26. The source of electrical energy may also include other devices which generate electrical energy in the form of signals without departing from the scope of the invention. The load supporting device 30 disclosed herein is a powered roller deck 31 of conventional design having a vehicle conveyor drive motor (not shown). Other types of load supporting devices such as, unpowered rollers, conveyor belts, tables, lift masts, side loading forks and the like are considered equivalents and within the spirit of the invention.

The load transfer station 12 disclosed herein is a powered roller conveyor 32 capable of transferring a load 34. However, other types of load transferring stations 12 such as, unpowered roller conveyors, belt and chain conveyors and the like are considered equivalents and within the scope of this invention. It is to be noted that the various load transfer stations are utilized to deliver load to a machine tool, storage area and assembly area. The load transfer station 12 has a frame 36 to which a plurality of rollers 38 are rotatively connected at their end portions 40. The rollers 38 are arranged parallel to each other and suitable for passing the load 34 sequentially along the rollers 38. The station frame 36 has first and second spaced apart substantially parallel guide rails 42,44 which extend above an upper planar surface 46 defined by tangent locations on the rollers 38 and maintains the load 34 on the rollers 38 and guides the load 34 during movement across the planar surface 46 defined by the rollers 38.

The load transfer station 12 has an electric motor 48 for rotating the rollers 38 and propelling the load 38 therealong. The electric motor 48 is mounted on the station frame 36 and drivingly connected to the rollers 38 at one end portion 40 thereof by a chain and sprocket arrangement 50 of conventional design. The powered roller deck 31 of the vehicle is constructed in a manner similar to that of the load transfer station 12 powered roller conveyor 32 and therefore will not be discussed in any greater detail. It is to be noted that other electric motors may be provided on the station 12 for driving devices such as manufacturing tools, stop gates and the like. Also, other devices, such as, electrically powered sensors and control systems may be provided on the load transfer station.

Referring to FIGS. 1,2,3, and 6, a power transferring arrangement 52 is provided for passing electrical energy from the source of electrical energy 28 on the vehicle 10 to the electric motor 48 associated with the load transfer station 12. The power transferring arrangement 52 includes a contactor assembly 54 having a contacting head portion 56. As shown in FIG. 6, the contacting head portion 56 is connected to the source of electrical energy 28 and a ground potential 58 by conductors 60,62, respectively. It should be noted that additional conductors may be provided without departing from the invention. Referring back to FIGS. 1 and 2, the contactor assembly 54 is connected to the vehicle frame 20 and the contacting head portion 56 is movable relative to the vehicle frame 20 between a first position closely adjacent the vehicle frame 20 and a second position outwardly of the vehicle frame 20, spaced from the first position. The contacting head portion 56 is shown in solid lines at the first position and in phantom lines at the second position. Preferably, at the first position, the contacting head portion 56 is between the first and second frame sides 24,26 so that contact with external objects during vehicle travel is avoided and damage to the contacting assembly 54 is prevented.

A means 64 is provided for receiving the contacting head portion 56 and for passing electric energy from the contacting head portion 56 to the electric motor 48 and control system (not shown) associated with the load transfer station 12. It is to be reiterated that the electric motor 48 may be used to power any one of or a combination of the devices or sensors and the like, as discussed above, without departing from the spirit of the invention. The receiving means 64 is mounted on the station frame 36 at a preselected elevational location from vehicle supporting surface 66 so that the contacting head portion 56 and the receiving means 64 may be aligned for engagement with each other. An axis 68 of the contactor assembly 54, along which the contacting head portion 56 moves, extends in a transverse direction relative to the longitudinal vehicle axis 22 and is preferably perpendicular to the first frame side 24. The preselected normal distance from the axis 68 to the underlying surface 66 is equal in magnitude to the preselected normal distance from the receiving means 64 to the surface 66. Therefore, when the vehicle 10 is docked at a preselected location adjacent the load, the contacting head portion 56 is aligned with the receiving means 64 for engagement by the contacting head portion 56 upon movement of the contacting head portion 56 from its first position toward its second position.

A means 70 is provided for sensing the position of the automatic guided vehicle 10 relative to the load transfer station 12 and for delivering a position control signal in response to the automatic guided vehicle 10 being at the above noted preselected location adjacent the load transfer station 12. The sensing means 70 preferable includes first and second sensors 72,74 mounted on the vehicle frame 20 at preselected locations on the frame 20 hereinafter discussed. The first and second sensors 72,74 are each adapted to deliver electromagnetic radiation and receive a reflection of the electromagnetic radiation. The means 70 also includes first and second reflective members 76,78 mounted at preselected spaced apart locations on the load transfer station 12 and particularly on the frame 36. The first and second sensors 76,78 are shown as being mounted on the first guide rail 42; however, other locations on the frame 36 would be suitable substitutes. The first and second reflective members 76,78 are aligned to reflect electromagnetic radiation to the first and second sensors 72,74, respectively, in response to the vehicle 10 being at the predetermined docked location relative to the load transfer station 12 mentioned above. The first and second sensors 72,74 are each mounted on the vehicle frame 20 at a location near the frame first side 24 and at a normal elevational distance from the surface 66 equal in magnitude to the normal elevational distance from the surface 66 to each of the reflective members 76,78. The first and second sensors 72,74 are preferably positioned to deliver electromagnetic radiation at a preselected included angle "A" relative to each other and in a direction transverse the vehicle longitudinal axis 22. Angle "A" lies in a plane 80 which is defined by the elevational height of the sensors 72,74 and reflective members 76,78 at the preselected location of the vehicle 10. The angularity of the sensors 72,74 and the spacing of the reflective members 76,78 establishes the location at which the vehicle 10 is docked for successful engagement between the contacting head portion 56 and the receiving means 64. The first sensor 72 also serves to identify if a load 34 is present on the powered roller conveyor 32 when the load 34 prevents electromagnetic radiation delivered by the first sensor 72 from being reflected by the first reflective member 76 back to the first sensor 72 while the second sensor 74 and second reflective member is aligned and receiving reflected electromagnetic radiation. Thus, alignment of a the second sensor 74 and second reflective member 78 is adequate to properly locate the vehicle 10 for alignment purposes. It is to be mentioned that some deviation from the nominal aligned vehicle position is permitted without affecting engagement for power transferring purposes. The first and second sensors 72,74 each deliver a position control signal in response to receiving a reflection of their respective delivered electromagnetic radiation. The control signal delivered is preferably a change in state of the sensor, such as + to − or vice versa.

Referring to FIG. 3, the receiving means 64 has a supporting portion 80' which is constructed of an electrically nonconductive material. The supporting portion 80' is secured to the station frame 36 in any suitable manner such as by fasteners 81. First and second spaced apart receiving pads 82,84 are connected to the supporting portion 80' in any suitable manner. It should be noted that additional receiving pads may be provided without departing from the invention. First and second conductors 86,88 are connected to the first and second receiving pads 82,84 and to the electrical motor 48 and pass electrical current from the contacting head portion 56 to the load transfer station's electrically powered motor 48.

The contacting head portion 56 has first and second contact tips 90,92 and a beam member 94. The beam member has first and second spaced apart end portions 96,98 and an intermediate portion 100 located between the first and second end portions 96,98. The first and second contact tips 90,92 are connected to the first and second end portions 96,98 and connected by the conductors 60,62, to the source 28 and ground potential 58, respectively. Each of the contact tips 90,92 have an electrical insulator 102 which is disposed in an aperture 104 in the first and second end portions 96,98 and insulates each of the contact tips 90,92 disposed in the apertures from contact with the beam member 94. The contact tips 90,92 preferably have spherical faces to assure contact when at an angle relative to the receiving means 64. The spacing of the first and second contact tips 90,92 and the first and second receiving pads 82,84, are substantially equal so that the first contact tip 90 is movable into engagement with the first receiving pad 82 and the second contact tip 92 is movable into engagement with the second receiving pad 84, both in response to movement of the contact head portion 56 toward the second position. Therefore, the first receiving pad 82 is connectable to the electrical source 28 and the second receiving pad 84 is connectable to the ground potential 58 upon engagement between receiving means 64 and the contacting head portion 56. The electric motor 48 is then powered by the source of electrical energy 28 of vehicle 10. It is to be noted that one could utilize the power transferring arrangement 52 to transfer power from a charging station (not shown) to the vehicle 10 for charging the battery 28 without departing from the invention.

As best seen in FIG. 6, a control means 106 is provided for receiving the position control signal and delivering an actuator control signal in response to receiving the position control signal. Delivery of the actuator control signal, as shown, allows electrical power to be delivered to the actuator means 108. The position control signal, as discussed above, requires at least a signal from the second sensor 74. An actuator means 108 receives the actuator control signal and moving the contacting head portion 56 from the first position toward the second position and into engagement with the receiving means 64. The first and second sensors 72,74 are each adapted to deliver a position control signal in response to receiving a reflection of their delivered electromagnetic radiation. When the control means 106 receives position control signals from both the first and second sensors 72,74 it processes this information and delivers a braking control signal in response thereto. Should the control means 106 receive a position control signal from the second sensor 74 and not the first sensor 72, both a braking and vehicle conveyor drive signal will be delivered in response to receiving only the position control signal of the second sensor 74.

Referring to FIG. 3, the actuator means 108 for moving the contacting head portion 56 from the first position toward the second position and into engagement with the receiving means 64 is preferably an electrically driven linear motor 114 having a housing 110, a rod 112 slidably disposed in the housing 110 and an electric motor 114 operatively connected to the rod 112 and adapted to move the rod 112 linearly relative to the housing 110. Linear actuators such as this are well known in the art. Therefore, the construction will not be discussed in any greater detail. As best seen in FIG. 6, the electric motor 114 is connected to the control means 106 by conductor 116 and receives the actuator control signal through conductor 116. The control means 106 is also connected to ground potential 58.

Means 118 is provided for receiving the brake control signal delivered by the control means 106 and stopping movement of the vehicle 10 in response to receiving the brake control signal. The stopping means 118 preferably includes first and second spring applied electrically released brakes 120,122 of a conventional design. The first and second brakes 120,122 are each connected to a wheel 18 and a respective first and second vehicle drive motor 124,126 such as by shafts 128. The brake control signal is preferably a change in state signal delivered from the control means 106 to the brakes 120,122. Thus, in the absence of a positive electrical (+) signal the brakes are spring applied. The brake control signals are delivered to the first and second brakes 120,122 by conductors 130,132.

Like the first and second brakes 120,122, the first and second vehicle drive motors 124, 126 are connected to the control means 106 by conductors 134,136 which deliver a motor control signal from the control means 106 to the first and second vehicle drive motors 124,126. The motor control signal, which is preferably a change of state signal, is delivered to the first and second drive motors and disables the first and second vehicle drive motors from rotating the wheels 18 whenever the second sensor 74 is receiving a reflection of its delivered electromagnetic radiation and the vehicle 10 is aligned.

The control means 106 preferable includes a micro computer which is capable of controlling the operation of the automatic guided vehicle 10 in response to feedback of a plurality of sensing devices (all not shown) on the vehicle 10 and in response to preprogrammed instructions located in memory. The control means 106 is connected to the first and second sensors 72,74 by first and second conductors 138,140 which deliver the position control signals from each of the sensors 72,74 to the control means 106. Also the navigation controller 16 and the vehicle the conveyor drive motor 33 are connected to the control means by conductors 142,144, respectively which deliver control signals therebetween. The control means 106, controls operation of the drive motors 124,126, based on signals from the navigation controller 16, the first and second sensors 72,74 and the aforementioned other sensors. The vehicle conveyor drive motor 33 responds to signals delivered from the control means 106 by conduit 144 which turns the conveyor motor 33 on or off for example, in response to the control means 106 receiving a signal from the second sensor 74 which based on the preprogrammed instructions informs the control means 106 that the vehicle is properly docked at the load transfer station 12 and ready to receive or eject a load 34.

The contactor assembly 54 includes a motion means 142 which permits movement of the contacting head portion 56 relative to the actuator means 108 in response to an external force of a preselected value being applied to the contacting head portion 56. The contacting head portion 56 is preferably movable in directions transverse the vehicle axis 22 and along the axis 68 of the contactor assembly 54 which is preferably linear and oriented substantially normal to the axis 22 in response to the external force of the preselected value being applied to the contacting head and along the axis 68. The force must be of a magnitude satisfactory for maintain the contacting head portion 56 in engagement with the receiving means 64, from bouncing and inadvertent movement relative thereto so that arcing and the like may be prevented during loading and unloading of the vehicle 10. The motion means 142 also accommodates for a limited amount of error in vehicle positioning, such as the distance between the vehicle and the load transfer station 12, by allowing biased movement of the contacting head portion 56 relative to the load transfer station 12.

The contactor assembly 54 and particularly the motion means 142 thereof includes means 144 for guiding the contacting head portion 56 for movement along linear axis 68 and transverse the longitudinal vehicle axis 22 during movement of the contacting head portion 56 between the first and second spaced apart positions. The guiding means 144 includes a housing 146 connected to the actuator means 108 and a guide member 148 connected to the contacting head portion 56. The housing 146 is slidably connected to the vehicle frame 20 by a bracket assembly 150 having a body 152 and a connecting flange 154. The body 152 and connecting flange 154 are secured to each other and the vehicle frame 20 in any suitable manner, for example, by threaded fastener 156. The body 152 has first and second substantially axially parallel apertures 158,160 disposed therethrough for receiving guide housing 146 and actuator housing 110. The guide housing 146 is cylindrical in shape and has an axial bore 162 disposed longitudinally therethrough. The bore 162 has a step bore portion at a first end portion 166 thereof which acts as a stop 164 for the guide member 148. Alternately, the stop function may be provided between the guide housing 146 and the guide member 148 at the second end portion 176 of the guide housing without departing from the invention. The guide member 148 is slidably disposed in the bore 162 of the guide housing 146 and telescopically movable along the axis 68 of the bore 162 between extended and retracted positions relative to the guide housing 146. The guide member 148 is an elongated cylindrically shaped spool having first and second spaced apart portions 167,169 which are slidably disposed in engagement with the bore 162. First and second bushings 168,170 are disposed in the first aperture 158 of the body 152 at opposite ends of the body 152. The flanged bushings 168,170 engage the guide housing 146 and guide the housing 146 for linear movement along the axis 68 in response to linear movement of the actuator rod 112.

The actuator housing 110, which is cylindrically shaped, is disposed in the second aperture 160 of the body 152 and securely retained therein from axial, radial and rotary movement in any suitable manner, for example, a set screw 172. The actuator housing 110, guide housing 146 and guide member 148, as a result of the substantial parallel orientation of the apertures 158,162 and the fit-up with associated components, such as the bushings 168,170, bore 162 and guide member 148, are maintained substantially axially parallel to each other. As best seen in FIGS. 4 and 5, the rod 112 is connected to the guide housing 146 by a flange assembly 174. The flange assembly 174 is clamping secured to the guide housing 146 at a second end portion 176 thereof and pivotally connected between bifrucated portions 178 thereof to rod 112 by a pin 180. The guide housing second end portion 176 is disposed in a bore 182 in the flange assembly 174. The flange assembly 174 is clamped to the guide housing 146 by virtue of threaded fastener 184 and split portion 186.

The motion means 142 also includes a biasing means 188 for urging the guide member 148 toward the extended position, at which the guide member is engaged with the stop 164, and the retracted position axially spaced from the stop 164 in response to the external force being applied to the contacting head portion 56. The biasing means 188 includes a coil spring 190 which is disposed in the bore 162 at the first end portion 166 of the guide housing 146 and between the guide member 148 and an end cap 192 located at the first end portion 169 of the guide housing 146. The spring 190 bears against the first end portion 167 of guide member 148 and urges the guide member 148 toward the extended position. This spring maintains the aforementioned force (preload) of the contacting head portion 56 against the receiving means 64 during electrical energy transfer. The end cap 192 disclosed herein has a bore 194 disposed therethrough and loosely slidably positioned about the actuator housing 110. This serves to prevent rotation of the guide housing 146 in the bushings 168,170. Other techniques for preventing rotation of the guide housing 146 may be utilized, such as guide rods, anti-rotation tabs and stops. It should be noted that the end cap 192 may be integral with the guide housing 146 instead of being screwthreadably connected thereto and retained from rotation by set screw 172.

The motion means 142 also includes a stop 196 which is connected to one of the guide housing 146 and guide member 148 and engageable with the other of the guide housing 146 and guide member 148. The stop 196 is preferably a pin 198 which is disposed in a radial through cross bore 200 disposed in the guide housing 146 at the second end portion 176 thereof and in an axially oriented elongated slot 202 disposed radially through the second end portion 169 of the guide member 148. The pin 198 by virtue of its connection to the guide housing 146 and disposition in the slot 202 and engagement with the guide member 148 and particularly the sides of the elongated slot 202 prevents rotation of the guide member 148 relative to the guide housing 146. As a result the contacting head portion 56 is maintained from rotation about axis 68 and for subsequent engagement with the receiving means 64. The slot 202 also may serve as an axial stop for the guide member 148 during movement of the guide member along the axis 68 and establish the extended and/or retracted positions of the guide member 148 in situations where the stop 164 is omitted.

The contacting head portion 56 preferably includes a beam member 204 having the first and second end portions 96,98, and intermediate portion 100. The beam member 204 has an aperture 206 disposed in the intermediate portion 100 and apertures 104 in the first and second end portions 96,98. Aperture 106 preferably has a convex crossection, as shown in FIG.3, to increase the amount of pivotal movement of the beam member 204. As previously discussed the contact tips 90,92 are disposed in the apertures 104 and connected to the first and second end portions 96,98, respectively.

Means 203 is provided for pivotally connecting the contacting head portion 56 to the guide member 148 and maintaining the contacting head portion 56 to the guide member 148 and maintaining the contacting head portion 56 for pivotal movement about the pivotal connecting means 203 in response to a tipping force being applied to the contacting head portion 56. The second end portion 169 of the guide member 148 is pivotally connected to the beam member 204 via a pivot pin 208 which allows for pivotal movement of the beam member 204 about the pin 208. Thus full and complete contact between the first and second contact tips 90,92 and the first and second receiving pads 82,84, respectively, is allowed in response to forceable engagement therewith. Pivotal movement of the beam member 204 occurs when the vehicle is skewed, cocked or otherwise not squarely oriented relative to the load transfer station 12 and forceable engagement is made beam member 204 and the receiving means 64.

The second end portion 169 of the guide member 148 has a tapered portion 210 which guides the contacting head portion 56 relative to the receiving means 64 just prior to contact between the receiving means 64 and the contacting head portion 56 and prevents engagement of the contacting head portion 56 with other undesirable and unappropriate surfaces. The tapered end portion 210 extends past the contacting head portion 56 an amount sufficient for preventing contact between the contacting head portion 56 and another surface when the contacting head portion 56 is pivoted the maximum allowable amount about the pivot pin 208. The tapered portion 210 is disposable in a tapered aperture 212, which is preferably an elongated slot, disposed in the supporting portion 80 of the receiving means 64 when the contacting head portion 56 is at the second position. The tapered bore 212 is effective to permit contact of the contacting head portion 56 with the receiving means 64 when properly aligned and guidably urges the contacting head portion 56 transversely relative to the axis 68 upon engagement between the tapered bore 212 and tapered end portion 210 during movement of the contacting head portion 56 toward the second position.

A means 214 is provided for stopping movement of the actuator means 108 in response to said guide member 148 being at said retracted position. The retracted position is a predetermined position between the spring 190 going solid and the extended position of the guide member 148. Factors such as the amount of acceptable error in vehicle 10 spacing from the load transfer station 12 are used to determine the amount of movement between the extended and retracted positions. The stopping means 214 includes an electrical switch 216 connected to the guide housing 146 and actuatable in response to the guide member being at the retracted position. The switch 216 prevents electrical energy from being delivered to the actuator means 108 in response to the guide member 148 being at the retracted position. The switch 216 shown is screw threadably mounted on the end cap 192 and has a plunger 218 engageable with the guide member 148. The plunger moves the switch 216 between open and closed positions. It is to be emphasized that other types of switches such as optical, proximity, Hall-Effect and the like would be suitable substitutes for the aforementioned described mechanical switch 216 without departing from the spirit of the invention.

A proximity sensor 220, of any suitable type, is connected to flange 154 adjacent the contacting head portion 56, at the first position of the contacting head portion 56, is connected to the control means 106, and delivers a control signal at the first position of the contacting head portion 56. The control signal delivered by the proximity sensor 220 is a change in state signal based on the absence and presence of the contacting head portion 56.

INDUSTRIAL APPLICABILITY

With reference to the drawings, as the automatic guided vehicle 10 approaches the load transfer station 12, at which the vehicle is to dock, the vehicle 10 slows, based on preprogrammed instructions stored in the control means 106. When the vehicle reaches the aligned position, ie., where the contacting head portion 56 is aligned for engagement with the receiving means 64 upon movement of the contacting head along the axis 68 toward the second position, the sensing means 70 delivers the control signal to the control means. The control means 106 responds to this received control signal and delivers a signal to stop power to the drive motors 124, 126 and release the spring applied brakes 120,122 to stop rotation of the wheels 18. The vehicle 10 is now stopped and aligned for power transfer.

As discussed above, the first and second sensors 72,74, each deliver a control signal when a reflection of the emitted electromagnetic is received, respectively. Alignment is also achieved when only one sensor is receiving reflected electromagnetic radiation. The absence of received reflected electromagnetic radiation by the first sensor 72 and the presence of received electromagnetic radiation by the second sensor 74 indicates that a load 34 is present at the load transfer station 12 and ready to be deposited on the vehicle 10. Thus, a signal received only from the second sensor 74, by the control means 106, will indicate a load present on the load transfer station 12. The control means 106 will compare this information to the preprogrammed instructions in memory and if appropriate will be ready to make power transfer connection and receive the load 34.

Upon completion of alignment the control means 106 will actuate the actuator means 108 which will move the contacting head portion 56 from the first position between the vehicle sides 24,26 toward a second position outside the vehicle sides 24,26 and into contact with the receiving means 64. Should the vehicle 10 be skewed or otherwise not square with the load transfer station 12 the pivotal connecting means 203 allows for pivotal movement of the contacting head portion 56 relative to the receiving means in response to contact therewith and full engagement between the first and second contact tips and the first and second receiving pads, respectively.

As the actuator means 108 moves the contacting head portion 56 into engagement with the receiving means 64 the biasing means 188 limits the force of engagement between the contacting head portion 56 and the receiving means 64 to a preselected maximum amount so that excessive loading is prevented while adequate contacting loading is maintained. The biasing means 188 also allows for movement of the guide housing 146 relative to the guide member 148 so that tolerances associated with the distance between the vehicle 10 and the load support station 12 can be accommodated during movement toward the second position.

When the actuator means 108 is extended the stopping means 214 is actuated which ceases further extension of the actuator means 108 and movement of the contactor assembly 54 toward the second position. The switch 216 when actuated by contact between plunger 218 and guide member 148 signals the control means 106 to cease further extension of the actuator means 108.

Should improper alignment take place the tapered end portion 210 of the guide member 148 will prevent engagement of the contacting head portion 56 with another improper surface since the tapered end portion contacts the improper surface first and prevents further movement of the contacting head portion 56. Therefore, the contacting head portion 56 is only engageable with the receiving means 64 and only when properly aligned for engagement.

Electrical energy is now deliverable from the source of electrical energy 28 to the load supporting station 12 and to the electric motor 48 of the load transfer station 12. Thus, need for permanent hard wiring of the load transfer station 12 is eliminated and the flexibility of relocating the load transfer station 12 is enhanced. Also, electrical control signals may be delivered in the same manner, between the vehicle 10 and load transfer station 12, from other sources of electrical energy, such as, control means 106, without departing from the invention.

The load 34 is then transferred from the load transfer station 12 to the vehicle 10 by the powered roller conveyor 32 driven by motor 48. Once the load is on the vehicle 10 the power transferring arrangement 52 is actuated by the control means 106 to retract from the second position toward the first position and within the vehicle sides 24,26. When the contacting head portion 56 is at the first position, the control means 106 is signaled by the proximity sensor 220 which results in the release of brakes 120,122 and the delivery of power to drive motors 126,126. The vehicle 10 is then free to transport the load 34 to another load transfer station (not shown) for deposit purposes.

Other aspects, objects and advantages of the present invention can be obtained from a study of the drawings, the disclosure and the appended claims.

We claim:

1. A power transferring arrangement for passing electrical energy from an electrical energy source between an automatic guided vehicle having a frame, and a longitudinal vehicle axis and a load transfer station; comprising:

a contactor assembly having a contacting head portion movably connected to the frame, said contacting head portion being movable between a first position closely adjacent the frame and a second position outwardly of the frame and spaced from the first position;

means for receiving said contacting head portion and passing electrical energy from said source and between the vehicle and load transfer station;

means for sensing the position of the vehicle relative to the load transfer station and delivering a position control signal in response to the automatic guided vehicle being at a predetermined location adjacent the load transfer station;

control means for receiving the position control signal and delivering an actuator control signal in response to receiving said position control signal; and actuator means for moving said contacting head portion from said first position toward said second position and into engagement with said receiving means in response to receiving said actuator control signal.

2. A power transferring arrangement, as set forth in claim 1, wherein said control means delivers a vehicle braking control signal in response to receiving said position control signal, and including means for receiving the brake control signal and stopping movement of the automatic guided vehicle in response to receiving said brake control signal.

3. A power transferring arrangement, as set forth in claim 1, wherein said sensing means includes;

first and second sensors mounted on the vehicle frame at preselected spaced apart locations on the frame, said first and second each being adapted to deliver electromagnetic radiation and to receive a reflection of said electromagnetic radiation; and first and second reflective members being mounted at preselected spaced apart locations on the load transfer station, said first and second reflective members being aligned to reflect electromagnetic radiation to said first and second sensors, respectively, in response to said vehicle being at said predetermined location relative to the load transfer station.

4. A power transferring arrangement, as set forth in claim 3, wherein said first and second sensors are positioned at a preselected included angle relative to each other and deliver electromagnetic radiation at the preselected included angle in a direction transverse the vehicle longitudinal axis.

5. A power transferring arrangement, as set forth in claim 3 wherein said first and second sensors each are adapted to deliver a position control signal in response to receiving a reflection of their delivered electromagnetic radiation, said control means being adapted to receive said position control signals and deliver a braking control signal and a vehicle conveyor drive signal in response to receiving a position control signal from the second sensor and in the absence of receiving a position control signal from the first sensor.

6. A power transferring arrangement, as set forth in claim 1, wherein said contacting head portion is moveable transversely of the longitudinal axis of the vehicle, said contacting head portion being aligned to engage the receiving means at said predetermined adjacent location of the automatic guided vehicle relative to the load transfer station.

7. A power transferring arrangement, as set forth in claim 1, wherein said contactor assembly includes motion means for permitting movement of the contacting head portion relative to the actuator means in response to an external force of a preselected value being applied to said contacting head portion.

8. A power transferring arrangement, as set forth in claim 7, wherein said contactor assembly has a linear axis positioned in a direction transversely of the longitudinal vehicle axis, said contacting head portion being movable along said linear axis in response to said external force being applied to said contacting head portion.

9. A power transferring arrangement, as set forth in claim 7, wherein said contactor assembly includes a guide housing connected to the actuator means and movable in response to movement of the actuator means, said motion means including:
 a guide member connected to said contacting head portion, slidably connected to said guide housing, and movable relative to the housing between an extended position and a retracted position; and
 biasing means for urging said guide member toward said extended position and permitting movement of said guide member toward said retracted position in response to the said external force being applied to the contacting head portion.

10. A power transferring arrangement, as set forth in claim 9, wherein said motion means includes a stop connected to one of the guide housing and guide member and engageable with the other of the guide housing and guide member, said stop member preventing rotation of the guide member relative to said guide housing.

11. A power transferring arrangement, as set forth in claim 10, wherein said stop includes;
 a pin connected to the guide housing; and
 an elongated slot disposed radially through and axially along the guide member, said pin being disposed in said slot, engageable with the guide member in said slot and maintaining the guide member from rotation relative to the guide housing.

12. A power transferring arrangement, as set forth in claim 9, including a ground potential, said guide member having a second end portion and said contacting head portion includes:
 a beam member having first and second spaced apart end portions and an intermediate portion located between said beam member first and second end portions, said beam member being pivotally connected at said intermediate portion to the guide member second end portion; and 13. A power transferring arrangement, as set forth in claim 9, including means for stopping movement of actuator means in response to said guide member being at said retracted position.

14. A power transferring arrangement, as set forth in claim 13, wherein said actuator means has an actuator motor connected to the source of electrical energy, said stopping means includes a switch connected to the guide housing and actuatable in response to the guide member being at the retracted position, said switch preventing electrical energy from being delivered to the actuator motor in response to the guide member being at the retracted position.

first and second contact tips connected to the beam member first and second end portions, respectively, and connected to the source of electrical energy and ground potential, respectively.

15. A power transferring arrangement, as set forth in claim 1, wherein said contactor assembly includes means for guiding said contacting head portion along a linear axis transverse the longitudinal vehicle axis during movement of the contacting head portion between said first and second positions.

16. A power transferring arrangement, as set forth in claim 15, wherein said guide means includes a guide member having a tapered end portion, said contacting head portion being connected to said guide member at a preselected axial location along the guide member spaced from the tapered end portion.

17. A power transferring arrangement, as set forth in claim 16, wherein said receiving means has a supporting portion and a tapered aperture disposed in the supporting portion, said tapered aperture being adapted to receive the tapered end portion of the guide member.

18. A power transferring arrangement, as set forth in claim 15, wherein said contactor assembly includes means for pivotally connecting the contacting head portion to the guide means and permitting pivotal movement of the contacting head portion relative to the guide means in response to engagement of the contacting head portion with the receiving means.

19. A power transferring arrangement, as set forth in claim 18, wherein said contacting head portion includes first and second contact tips, and said receiving means includes first and second spaced apart receiving pads, said first and second contact tips engaging said first and second receiving pads at the second position of the contacting head portion, said contacting head portion being pivotally movable to maintain said first and second contact tips in engagement with the first and second receiving pads, respectively.

20. A power transferring arrangement, as set forth in claim 19, wherein said receiving pads are connected to an electrically powered motor associated with the load transfer station and pass electrical current from the contacting head portion to the load transfer station electrically powered motor.

21. A power transferring arrangement, as set forth in claim 1, wherein said source of electrical energy is mounted on the vehicle and connected to said contacting head portion, said load transfer station having an electric motor mounted thereon and connected to said receiving means, said contactor assembly passing electrical energy from the source of electrical energy to the electric motor in response to the contacting head portion being engaged with the receiving means.

22. A power transferring arrangement for passing electrical energy from a work vehicle having a frame, a longitudinal vehicle axis, and a source of electrical energy to a load transfer station having an electrically powered motor; comprising:
 a contactor assembly having a contacting head portion connected to the source of electrical energy and movably connected to the frame, said contacting head portion being movable between a first position closely adjacent the frame and a second position outwardly of the frame and spaced from the first position, said contactor assembly having a housing connected to the actuator and movable in response to movement of the actuator, a guide member connected to said contacting head portion, slidably connected to said guide housing, and movable relative to the guide housing between an extended position and a retracted position, and a biasing means for urging said guide member toward said extended position and permitting movement of said guide member toward said retracted position in response to the said external force of said preselected minimum magnitude being applied to the contacting head;

means for receiving said contacting head portion and passing electrical energy from said contacting head portion to said electric motor, said receiving means being connected to said load transfer station; and actuator means for receiving said actuator control signal and moving said contacting head portion from said first position toward said second position and into engagement with said receiving means.

23. A power transferring arrangement, as set forth in claim 22, including means for pivotally connecting the contacting head portion to said guide member and maintaining said contacting head portion for pivotal movement about said pivotal connecting means in response to a tipping force being applied to the contacting head portion.

24. A power transferring arrangement, as set forth in claim 23, wherein said guide member has a tapered end portion and said contacting head portion is axially spaced from said tapered end portion.

25. A power transferring arrangement, as set forth in claim 22, including:

a stop connected to one of the guide housing and guide member and engageable with the other of the guide housing and guide member, said stop maintaining the guide member from rotation relative to the guide housing; and means for stopping movement of actuator means in response to said guide member being at said retracted position.

* * * * *

UNITED STATES PATENT AND TRADEMARK OFFICE
CERTIFICATE OF CORRECTION

PATENT NO. : 4,944,357

DATED : July 31, 1990

INVENTOR(S) : JOHN E. WIBLE and PAUL D. GROHSMEYER

It is certified that error appears in the above-identified patent and that said Letters Patent is hereby corrected as shown below:

Column 15, claim 12, beginning as a paragraph at line 11, insert --first and second contact tips connected to the beam member first and second end portions, respectively, and connected to the source of electrical energy and ground potential, respectively.--

Column 15, claim 14, beginning at line 10, delete "first and second contact tips connected to the beam member first and second end portions, respectively, and connected to the source of electrical energy and ground potential, respectively."

Signed and Sealed this

Nineteenth Day of November, 1991

Attest:

HARRY F. MANBECK, JR.

*Attesting Officer*  *Commissioner of Patents and Trademarks*